US009678823B2

(12) United States Patent
Kumeta et al.

(10) Patent No.: US 9,678,823 B2
(45) Date of Patent: Jun. 13, 2017

(54) INFORMATION PROCESSING APPARATUS, INFORMATION PROCESSING METHOD, AND INFORMATION PROCESSING SYSTEM

(71) Applicant: FUJITSU LIMITED, Kawasaki-shi, Kanagawa (JP)

(72) Inventors: Tomoyuki Kumeta, Shiroi (JP); Yasuhiro Kawasaki, Kobe (JP); Keita Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 30 days.

(21) Appl. No.: 14/722,655

(22) Filed: May 27, 2015

(65) Prior Publication Data

US 2016/0070612 A1    Mar. 10, 2016

(30) Foreign Application Priority Data

Sep. 4, 2014    (JP) ................................. 2014-180647

(51) Int. Cl.
G06F 11/00 (2006.01)
G06F 11/07 (2006.01)
G06F 9/455 (2006.01)

(52) U.S. Cl.
CPC ........ *G06F 11/079* (2013.01); *G06F 9/45558* (2013.01); *G06F 11/073* (2013.01); *G06F 2009/4557* (2013.01)

(58) Field of Classification Search
USPC ...................................................... 714/4.11
See application file for complete search history.

(56) References Cited

U.S. PATENT DOCUMENTS

| 8,146,082 B2 * | 3/2012 | Belay | G06F 9/45558 711/6 |
| 8,224,957 B2 * | 7/2012 | Hansson | G06F 9/5077 709/224 |
| 8,341,626 B1 * | 12/2012 | Gardner | G06F 9/4856 718/1 |
| 8,464,259 B2 * | 6/2013 | Belay | G06F 9/45558 711/6 |

(Continued)

FOREIGN PATENT DOCUMENTS

| JP | 2010-237926 | 10/2010 |
| JP | 2011-209811 | 10/2011 |
| WO | WO 2010/050249 A1 | 5/2010 |

*Primary Examiner* — Amine Riad
(74) *Attorney, Agent, or Firm* — Staas & Halsey LLP

(57) ABSTRACT

An apparatus includes a memory configured to hold a condition for determining whether or not to migrate a virtual machine that runs on a certain information processing apparatus included in a plurality of information processing apparatuses, to other information processing apparatus included in the plurality of information processing apparatuses, and a processor coupled to the memory and configured to when the condition is satisfied in a first information processing apparatus included in the plurality of information processing apparatuses, migrate a first virtual machine that runs on the first information processing apparatus to another information processing apparatus included in the plurality of information processing apparatuses, after migrating the first virtual machine, detect a status of an error occurring in the first information processing apparatus, and change the condition, based on the detected status of the error.

20 Claims, 11 Drawing Sheets

(56) References Cited

U.S. PATENT DOCUMENTS

| | | | |
|---|---|---|---|
| 9,081,599 B2* | 7/2015 | Tsirkin | G06F 9/48 |
| 2005/0251802 A1* | 11/2005 | Bozek | G06F 9/5077 |
| | | | 718/1 |
| 2007/0260417 A1* | 11/2007 | Starmer | G01K 7/425 |
| | | | 702/136 |
| 2008/0101587 A1* | 5/2008 | Gabrielson | H05K 7/1459 |
| | | | 379/326 |
| 2009/0006493 A1* | 1/2009 | Draper | G06F 8/71 |
| 2009/0031307 A1* | 1/2009 | Chodroff | G06F 9/5077 |
| | | | 718/100 |
| 2011/0126206 A1 | 5/2011 | Kato et al. | |
| 2012/0221710 A1* | 8/2012 | Tsirkin | G06F 9/5077 |
| | | | 709/224 |
| 2012/0278571 A1* | 11/2012 | Fleming | G06F 9/455 |
| | | | 711/162 |
| 2013/0326173 A1* | 12/2013 | Tsirkin | G06F 9/45558 |
| | | | 711/162 |
| 2013/0326174 A1* | 12/2013 | Tsirkin | G06F 9/45558 |
| | | | 711/162 |
| 2013/0346613 A1* | 12/2013 | Tarasuk-Levin | G06F 9/45558 |
| | | | 709/226 |
| 2014/0108854 A1* | 4/2014 | Antony | G06F 11/203 |
| | | | 714/4.2 |
| 2015/0169349 A1* | 6/2015 | Joffe | G06F 9/45558 |
| | | | 718/1 |
| 2015/0372878 A1* | 12/2015 | Ganesan | H04L 43/16 |
| | | | 709/223 |

* cited by examiner

FIG. 3

| DEVICE ID | OPERATIONAL VM | OPERATIONAL SYSTEM |
|---|---|---|
| M01 | VM01 | COMPANY A |
| M01 | VM02 | COMPANY B |
| M01 | VM03 | COMPANY C |
| ⋮ | ⋮ | ⋮ |

FIG. 4

| TARGET SYSTEM | WAR | EARTHQUAKE (SCALE) | EARTHQUAKE (FREQUENCY) | RAINFALL AMOUNT | VOLCANIC ASH | CONTAGIOUS DISEASE |
|---|---|---|---|---|---|---|
| COMPANY A | 1 TIME | SEISMIC INTENSITY OF 6 1 TIME/DAY | SEISMIC INTENSITY OF 3 10 TIMES/DAY | 400mm/H | 30mm | 20 PERSONS/DAY |
| COMPANY B | 1 TIME | SEISMIC INTENSITY OF 6 1 TIME/DAY | SEISMIC INTENSITY OF 3 15 TIMES/DAY | 400mm/H | 40mm | 5 PERSONS/DAY |
| COMPANY C | 1 TIME | SEISMIC INTENSITY OF 6 1 TIME/DAY | SEISMIC INTENSITY OF 3 25 TIMES/DAY | 300mm/H | 20mm | 15 PERSONS/DAY |
| ... | ... | ... | ... | ... | ... | ... |
| COMPANY X | 1 TIME | SEISMIC INTENSITY OF 6 1 TIME/DAY | SEISMIC INTENSITY OF 3 5 TIMES/DAY | 200mm/H | 20mm | 10 PERSONS/DAY |

FIG. 5

| TARGET SYSTEM | WAR | EARTHQUAKE (SCALE) | EARTHQUAKE (FREQUENCY) | RAINFALL AMOUNT | VOLCANIC ASH | CONTAGIOUS DISEASE |
|---|---|---|---|---|---|---|
| COUNTRY A | NORMAL | NORMAL | SEISMIC INTENSITY OF 3 7 TIMES/DAY | NORMAL | NORMAL | NORMAL |
| COUNTRY B | NORMAL | NORMAL | NORMAL | NORMAL | NORMAL | NORMAL |
| COUNTRY C | NORMAL | NORMAL | NORMAL | NORMAL | NORMAL | NORMAL |
| ⋮ | ⋮ | ⋮ | ⋮ | ⋮ | ⋮ | ⋮ |
| COUNTRY E | NORMAL | NORMAL | NORMAL | NORMAL | NORMAL | NORMAL |

FIG. 6

| TARGET SYSTEM | WAR | EARTHQUAKE (SCALE) | EARTHQUAKE (FREQUENCY) | RAINFALL AMOUNT | VOLCANIC ASH | CONTAGIOUS DISEASE |
|---|---|---|---|---|---|---|
| COMPANY A | NOT PERMIT | PERMIT | PERMIT | PERMIT | PERMIT | PERMIT |
| COMPANY B | NOT PERMIT | PERMIT | PERMIT | PERMIT | PERMIT | PERMIT |
| COMPANY C | NOT PERMIT | PERMIT | PERMIT | PERMIT | PERMIT | PERMIT |
| ⋮ | ⋮ | ⋮ | ⋮ | ⋮ | ⋮ | ⋮ |
| COMPANY X | NOT PERMIT | PERMIT | PERMIT | PERMIT | PERMIT | PERMIT |

FIG. 7

|  | MIGRATION DESTINATION | | | | |
|---|---|---|---|---|---|
| TARGET SYSTEM | COUNTRY A | COUNTRY B | COUNTRY C | COUNTRY D | COUNTRY E |
| COMPANY A | 1 | 2 | 3 | 4 | 5 |
| COMPANY B | 1 | 2 | 3 | 4 | 5 |
| COMPANY C | 2 | 1 | 3 | 4 | 5 |
| COMPANY D | 3 | 1 | 2 | 4 | 5 |
| ⋮ | ⋮ | ⋮ | ⋮ | ⋮ | ⋮ |
| COMPANY E | 5 | 4 | 3 | 2 | 1 |

INFORMATION PROCESSING APPARATUS, INFORMATION PROCESSING METHOD, AND INFORMATION PROCESSING SYSTEM

CROSS-REFERENCE TO RELATED APPLICATION

This application is based upon and claims the benefit of priority of the prior Japanese Patent Application No. 2014-180647, filed on Sep. 4, 2014, the entire contents of which are incorporated herein by reference.

FIELD

The embodiments discussed herein are related to an information processing apparatus, an information processing method, and an information processing system.

BACKGROUND

Recently, virtualization technology whereby virtual machines (VMs) run on a physical server has been used. For example, there is an increasing number of data centers in environments in which virtual machines run on a physical server through the use of virtualization programs. The virtualization programs have capabilities of moving virtual machines running on a physical server onto a physical server of another data center. Such movement of a virtual machine is referred to as "migration".

The following techniques using the capabilities of migration have been proposed. For example, there is a technique in which, once one of a plurality of data centers coupled so as to be capable of mutually transmitting and receiving data receives information of a disaster, the system is moved to a data center that is not affected by the disaster. Examples of the related art documents include Japanese Laid-open Patent Publication No. 2010-237926, Japanese Laid-open Patent Publication No. 2011-209811, and International Publication Pamphlet No. WO 2010/050249.

SUMMARY

According to an aspect of the invention, an apparatus includes a memory configured to hold a condition for determining whether or not to migrate a virtual machine that runs on a certain information processing apparatus included in a plurality of information processing apparatuses, to other information processing apparatus included in the plurality of information processing apparatuses, and a processor coupled to the memory and configured to when the condition is satisfied in a first information processing apparatus included in the plurality of information processing apparatuses, migrate a first virtual machine that runs on the first information processing apparatus to another information processing apparatus included in the plurality of information processing apparatuses, after migrating the first virtual machine, detect a status of an error occurring in the first information processing apparatus, and change the condition, based on the detected status of the error.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram depicting an example of a data configuration of operations system information;

FIG. 4 is a diagram depicting an example of a data configuration of migration condition information;

FIG. 5 is a diagram depicting an example of a data configuration of disaster occurrence status information;

FIG. 6 is a diagram depicting an example of a data configuration of change setting information;

FIG. 7 is a diagram depicting an example of a data configuration of priority order information;

DESCRIPTION OF EMBODIMENTS

In existing techniques, upon receipt of information on a disaster, system migration is performed. Therefore, even though the disaster has no effect on the data center that has received the information on the disaster and thus no effect on system operations, unnecessary migration is performed in some cases. As system migration is sometimes expensive, occurrence of unnecessary migration increases running costs.

It is an object of one aspect of the present disclosure to provide a management device, a migration control program, and an information processing system capable of reducing the occurrence of unnecessary migration.

According to one aspect of the present disclosure, the occurrence of unnecessary migration may be reduced.

Hereinafter, embodiments of a management device, a migration control program, and an information processing system disclosed in the present application will be described in detail in conjunction with the accompanying drawings. The embodiments are applied to an information processing system including a plurality of data centers that provide virtual machines. It is to be noted that the present disclosure is not limited by the embodiments. Furthermore, embodiments may be appropriately combined to the extent that the processing details are not inconsistent.

First Embodiment

Configuration of Information Processing System According to Embodiment

Figure 1:
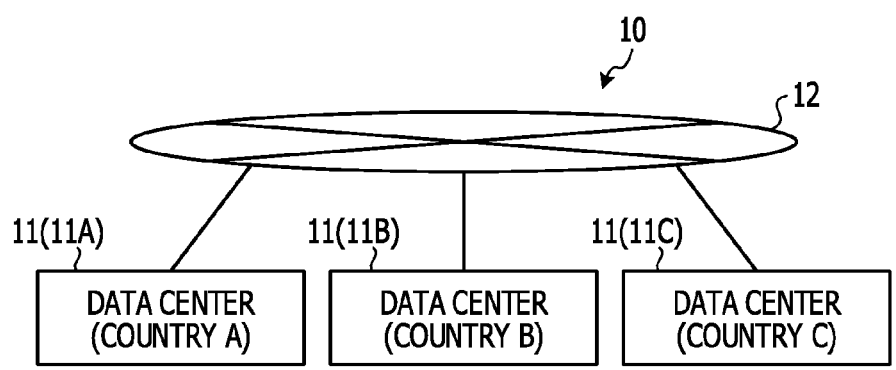
FIG. 1 is a diagram illustrating a hardware configuration of an information processing system according to an embodiment.

FIG. 1 is a diagram illustrating a hardware configuration of an information processing system according to an embodiment. As illustrated in FIG. 1, an information processing system 10 includes a plurality of data centers (DC) 11. The plurality of data centers 11 are each coupled via a network 12. The network 12 may be an exclusive line or may not be an exclusive line. The information processing system 10 is a system in which a VM may be moved via the network 12 between the data centers 11. Note that although, in the example of FIG. 1, three data centers 11A, 11B, and 11C are illustrated, the number of data centers 11 may be any number of two or more.

Each data center 11 is located at a location geographically separate from the locations of the other data centers 11 so that, when an abnormality due to a disaster or the like has occurred at any of the data centers 11, the other data centers 11 are not affected by the abnormality. In this embodiment, the data centers 11 are located in, for example, different areas such as different countries. For example, data centers 11A, 11B, and 11C are located in country A, country B, and country C, respectively.

[Hardware Configuration of Data Center]

Figure 2:
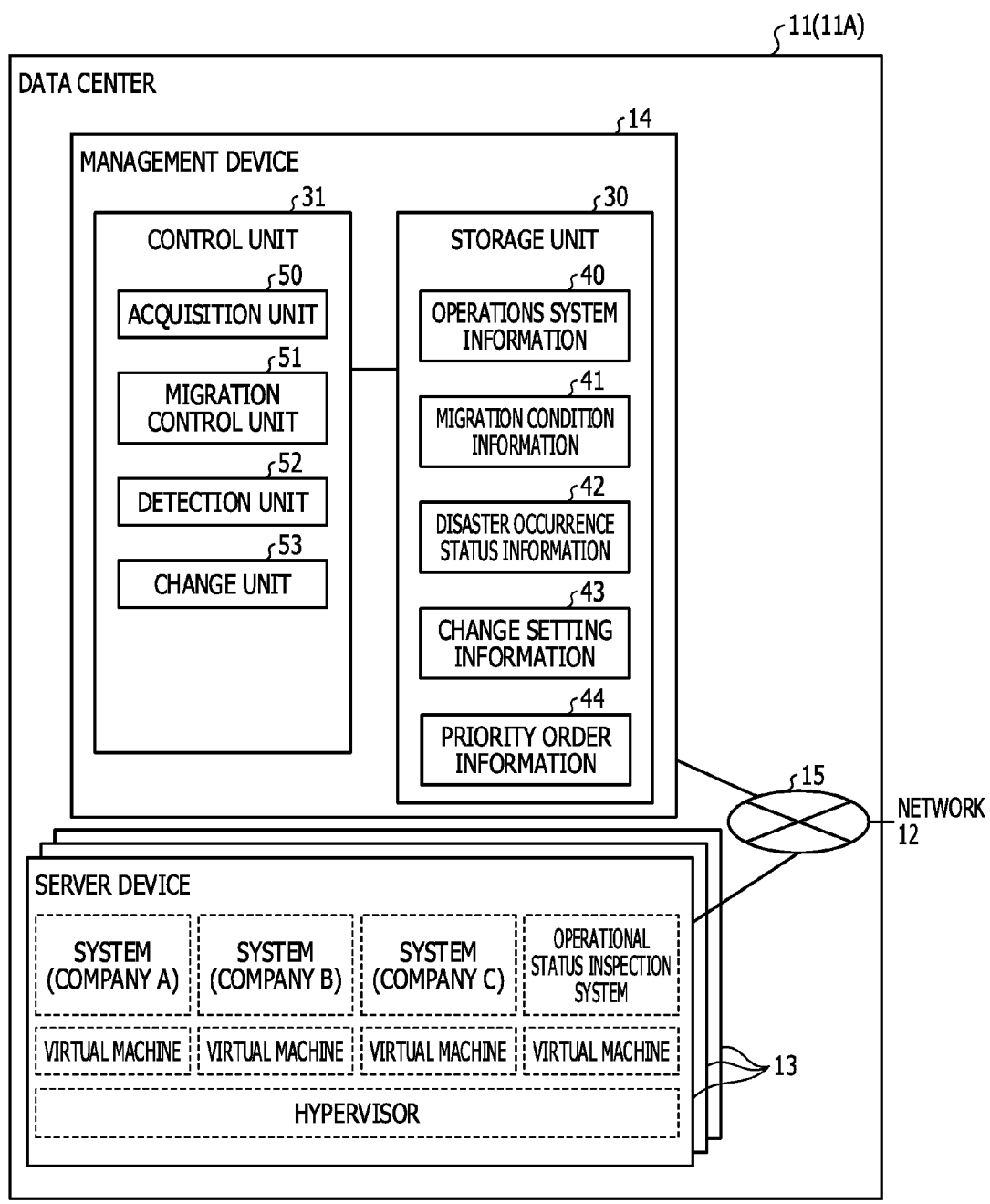
FIG. 2 is a diagram illustrating a functional configuration of a data center according to the embodiment.

Next, the functional configuration of the data center 11 will be described with reference to FIG. 2. FIG. 2 is a diagram illustrating a functional configuration of a data center according to the embodiment. Note that the functional configurations of the data centers 11A to 11C are substantially the same, and therefore an example of only data center 11A will be given.

The data center 11 includes a plurality of server devices 13 and a management device 14. The plurality of server devices 13 and the management device 14 are coupled via a network 15 so as to be able to communicate with each other. The network 15 is communicatively coupled with the network 12 and is able to communicate with other data centers 11 via the network 12. Note that, in the example of FIG. 2, three server devices 13 are illustrated; however, any number of server devices 13 may be used. In the example of FIG. 2, one management device 14 is illustrated; however, two or more management devices 14 may be used.

The server device 13 is a physical server that causes a virtual machine, which is obtained by virtualizing a computer, to operate to provide various kinds of services to the user, and is, for example, a server computer. The server device 13 executes a server virtualization program to run a plurality of virtual machines on a hypervisor and to run application programs on the virtual machines in accordance with customers, thereby causing the customer systems to run. In this embodiment, systems of various enterprises operate as the systems of customers. In the example of FIG. 2, the systems of company A, company B, and company C operate as the systems of customers. The server device 13 also causes virtual machines to operate and causes an operational status inspection system to run on the virtual machines. The operational status inspection system may be a dedicated system for inspecting the operational status of the data centers 11, and a management system that manages the data centers 11 may also be used as the operational status inspection system.

The management device 14 is a physical server that manages and uses the server devices 13 and is, for example, a server computer. The management device 14 manages virtual machines that run on each server device 13 and transmits a migration instruction of a virtual machine to each server device 13 to control migration of the virtual machines.

The management device 14 of each data center 11 is capable of mutually transmit and receive information, and is able to grasp the status of other data centers 11 based on information received from the management devices 14 of the other data centers 11. In the information processing system 10, any management device 14 of any data center 11 may be used as a management device that manages the entirety of the information processing system 10. The management devices 14 of the other data centers 11 notify the management device 14 serving as a management device that manages the entire information processing system 10 of the status of the data centers 11. For example, the management device 14 has a master-slave relationship with the management devices 14 of the other data centers 11. The master-slave relationship among the management devices may be set in advance by the administrator or may be set by using a program in accordance with a given setting procedure. The slave management devices 14 notify the master management device 14 of the status of the data centers 11. The master management device 14 notifies the slave management devices 14 of the other data centers 11 of instructions related to the operations of the data center 11. For example, the master management device 14 notifies the slave management devices 14 of the other data centers 11 of instructions for migrating virtual machines. The slave management devices 14 execute instructions related to the operations of the data center 11 in accordance with the notified instructions. For example, in accordance with an instruction for migration, the slave management device 14 issues instructions for migration to the server devices 13 to implement migration of virtual machines. Note that the management device 14 serving as the master of the master-slave relationship will be referred to as a "lead". Hereinafter, description will be given assuming that the management device 14 of the data center 11A is a "lead".

[Configuration of Management Device]

Next, the configuration of the management device 14 according to the first embodiment will be described. As illustrated in FIG. 2, the management device 14 includes a storage unit 30 and a control unit 31. Note that the management device 14 may include units having various function included in a known computer, other than the units having specific functions illustrated in FIG. 2. For example, the management device 14 may have a display unit that displays various kinds of information and an input unit that inputs various kinds of information.

The storage unit 30 is a storage device that stores various kinds of data. For example, the storage unit 30 is a storage device such as a hard disk, a solid state drive (SSD), or an optical disk. Note that the storage unit 30 may be a data rewritable semiconductor memory such as a random access memory (RAM), a flash memory, or a non-volatile static random access memory (NVSRAM).

The storage unit 30 stores an operating system (OS) and various programs executed by the control unit 31. For example, the storage unit 30 stores various programs including programs for performing a migration control process and a return process described below. Furthermore, the storage unit 30 stores various kinds of data used for programs executed by the control unit 31. For example, the storage unit 30 stores operations system information 40, migration condition information 41, disaster occurrence status information 42, change setting information 43, and priority order information 44.

The operations system information 40 is data that stores information on virtual machines and systems running on each server device 13. For example, in the operations system information 40, virtual machines and systems that run on the server devices 13 are stored in association with the server devices 13.

FIG. 3 is a diagram depicting an example of a data configuration of operations system information. As depicted in FIG. 3, the operations system information 40 includes fields "Device ID", "Operational VM", and "Operational system". The device ID field is a field that stores identification information for identifying the server device 13. Each server device 13 is assigned a device identifier (ID), which is identification information identifying each server device 13. The device ID field stores the device ID assigned to each server device 13. The operational VM field is a field that stores identification information for identifying a virtual machine running on the server device 13 identified by the device ID. Each virtual machine is assigned a machine ID, which is identification information for identifying each virtual machine. The operational VM field stores the machine ID assigned to each virtual machine running on the server device 13 identified by the device ID. The operational system field is a field that stores identification information for identifying the system of a particular company that is running on a virtual machine, and indicates the system with the name of the company running the system on a virtual machine.

The example of FIG. 3 illustrates a virtual machine with a machine ID "VM01" running on the server device 13 with a device ID "M01" and a system of "Company A" running on the virtual machine.

The migration condition information 41 is data storing information on conditions for migrating a system. In the data center 11, when a disaster has occurred, it is sometimes impossible for the system of a customer to operate. Therefore, in the migration condition information 41, migration conditions for migrating a system are stored by type of disaster for each system to be migrated. The type of disaster specifies kinds of disasters for which a system might be impossible to operate. Disasters include human disasters and natural disasters. In this embodiment, descriptions are given of cases where the type of disaster is, for example, war, which is an example of a human disaster, and scale of an earthquake, frequency of an earthquake, rainfall amount, volcanic ash, and contagious disease, which are examples of natural disasters. With regard to war and earthquakes, there are cases where the building of the data center 11 sustains direct damage and where the data center 11 sustains indirect damage such as disruption of the power supply to the data center 11 and communication lines being affected. With regard to rainfall, there are cases where the data center 11 sustains direct damage such as flooding and indirect damage such as disruption of the power supply to the data center 11 and communication lines being affected. With regard to a contagious disease, if the administrator of the data center 11 contracts a contagious disease, operations of the data center 11 will be affected. As a result, in some cases, the system is not able to operate stably. Examples of a contagious disease include influenza. Note that the types of disaster are not limited to the above and may be any disaster for which a system might be impossible to operate.

FIG. 4 is a diagram depicting an example of a data configuration of migration condition information. As depicted in FIG. 4, the migration condition information 41 includes fields "Target system", "War", "Earthquake (scale)", "Earthquake (frequency)", "Rainfall amount" "Volcanic ash" and "Contagious disease". The target system field is a field that stores a system to be migrated under the condition that a disaster, examples of which include natural disasters and human disasters, has occurred. Note that each field of the migration condition information may be optionally set in accordance with a situation unique to the region where the data center is located, and is not limited to the above. In this embodiment, the systems of company A, company B, company C, . . . , company X run on virtual machines. In this embodiment, the systems of company A, company B, company C, . . . , company X are migration targets. The earthquake (scale), earthquake (frequency), rainfall amount, volcanic ash, and contagious disease fields are fields that store migration conditions for migrating a system. When any of the migration conditions stored in the earthquake (scale), earthquake (frequency), rainfall amount, volcanic ash, and contagious disease fields is satisfied, a system for which the migration condition is satisfied is migrated. Note that contagious disease may be a migration condition for a specific contagious disease, and may also be a migration condition without a limitation on the kind of contagious disease.

The example of FIG. 4 illustrates that, for a system of "Company A", when a war has started, when an earthquake with a seismic intensity of 6 or more has occurred in one day, or when an earthquake with a seismic intensity of 3 or more has occurred 10 times in one day, the system is migrated. The example also illustrates that, for the system of "Company A", when the rainfall amount is greater than or equal to 400 mm/H, when the volcanic ash has accumulated to a depth greater than or equal to 30 mm, or when the number of patients of a contagious disease per hospital is 20 or more a day, the system is migrated. The initial values of these migration conditions are, for example, set by the administrator in response to a request from a customer to the system.

The disaster occurrence status information 42 stores information about disasters in a region where the data center 11 is located. For example, for each disaster for which migration conditions are set, data on the status of the occurrence of a disaster is stored in the disaster occurrence status information 42.

FIG. 5 is a diagram depicting an example of a data configuration of disaster occurrence status information. As depicted in FIG. 5, the disaster occurrence status information 42 includes fields "Data center", "War", "Earthquake (scale)", "Earthquake (frequency)", "Rainfall amount", and "Contagious disease". The data center field is a field that stores identification information for identifying the data center 11. In this embodiment, the country in which the data center 11 is located is used as identification information for identifying the data center 11, and the data center field stores the country in which the data center 11 is located. The earthquake (scale), earthquake (frequency), rainfall amount, volcanic ash, and contagious disease fields are fields that store the status of the occurrence of the respective disaster. The earthquake (scale), earthquake (frequency), rainfall amount, volcanic ash, and contagious disease fields store data indicating the status of occurrence when a disaster has occurred, with "normal" being stored when no disaster has occurred.

The example of FIG. 5 illustrates that, in the data center 11 of "Country A", a war, an earthquake with a seismic intensity of 6 or more, rainfall, volcanic ash, and a contagious disease have not occurred, while an earthquake with a seismic intensity of 3 or more has occurred seven times.

The change setting information 43 is data in which information on whether or not to permit a change of a migration condition is stored. For example, in the change setting information 43, settings of whether or not to permit a change of a migration condition are stored.

FIG. 6 is a diagram depicting an example of a data configuration of change setting information. As depicted in FIG. 6, the change setting information 43 includes fields "Target system", "War", "Earthquake (scale)", "Earthquake (frequency)", "Rainfall amount", "Volcanic ash", and "Contagious disease". The target system filed is a field that stores a system for which whether or not to permit a change of a migration condition is set. The earthquake (scale), earthquake (frequency), rainfall amount, volcanic ash, and contagious disease fields are fields that store settings for whether or not to permit changes of the respective migration conditions are stored. In the earthquake (scale), earthquake (frequency), rainfall amount, volcanic ash, and contagious disease fields, "permit" is set when a change of a migration condition is permitted, and "not permit" is set when a change of a migration condition is not permitted.

The example of FIG. 6 illustrates that, in the system of "Company A", a change of a migration condition is not permitted for war, while changes of migration conditions are permitted for earthquake (scale), earthquake (frequency), rainfall amount, volcanic ash, and contagious disease.

The priority order information 44 stores information on the priority orders of migration destinations. For example, the priority orders of the data centers 11 serving as migration destinations are stored in the priority order information 44 for each system to be migrated.

FIG. 7 is a diagram depicting an example of a data configuration of priority order information. As depicted in FIG. 7, the priority order information 44 includes fields "Target system" and "Migration destination". The target system field is a field that stores the system to be associated with a priority order. The migration destination field is a field that stores the data center 11 to which a system is able to be migrated. Migration destinations are classified into "Country A", "Country B", "Country C", "Country D", "Country D", and "Country E", which indicate the countries in which the data centers 11 to which systems may be migrated are located, and numbers indicating priority order are set for the countries. The numbers indicating priority order are set such that the smaller the number, the higher the priority.

In the example of FIG. 7, for the system of "Company A", the migration destinations are set, in decreasing order of priority, such that the highest priority is assigned to country A, the second to country B, the third to country C, the fourth to county D, and the fifth to country E.

With reference back to FIG. 2, the control unit 31 is a device that controls the management device 14. As the control unit 31, an electronic circuit such as a central processing unit (CPU) or a micro processing unit (MPU), or an integrated circuit such as an application specific integrated circuit (ASIC) or a field programmable gate array (FPGA) may be adopted. The control unit 31 includes internal memory for storing programs that define various kinds of processing procedures and for storing control data, and performs various types of processing by using these programs and data. The control unit 31 performs various types of processing in accordance with various types of programs. For example, the control unit 31 includes an acquisition unit 50, a migration control unit 51, a detection unit 52, and a change unit 53.

The acquisition unit 50 acquires various kinds of data. For example, the acquisition unit 50 acquires disaster information indicating the status of occurrence of a disaster that has an effect on the data center 11. The disaster information may be acquired from a server of a contractor in charge of a service that offers disaster information. The disaster information may also be acquired via a request performed by the administrator or the like. For example, the acquisition unit 50 acquires disaster information on an earthquake, rainfall amount, volcanic ash, and a contagious disease in a region where the data center 11 is located. The acquisition unit 50 updates the disaster occurrence status information 42 based on the acquired disaster information.

The lead management device 14 acquires disaster information from the management device 14 of each of the data centers 11. For example, the acquisition unit 50 of the management device 14 of the data center 11A acquires disaster information stored in the disaster occurrence status information 42 from the management device 14 of each of the other data centers 11. This disaster information may be periodically transmitted by the management devices 14 of the other data centers 11. The disaster information may also be transmitted such that the acquisition unit 50 of the lead management device 14 requests the management devices 14 of the other data centers 11 to transmit disaster information, and the management devices 14 of the other data centers 11 transmit the disaster information in response to the request.

The migration control unit 51 performs migration of virtual machines. When disaster information acquired by the acquisition unit 50 satisfies any migration condition of the migration condition information 41 stored in the storage unit 30, the migration control unit 51 migrates a system that satisfies the migration condition. For example, the migration control unit 51 identifies a system for which the status of occurrence of a disaster indicated by disaster information satisfies a migration condition, as a system to be evacuated. Using disaster information acquired from other data centers 11, the migration control unit 51 identifies the data center 11 whose status of occurrence of a disaster does not satisfy migration conditions of the system to be evacuated, as the data center 11 serving as the migration destination. The migration control unit 51 migrates the system to be evacuated, to the data center 11 serving as the migration destination. Note that, if a plurality of data centers 11 do not satisfy the migration conditions, the migration control unit 51 refers to the priority order of each data center 11 in the priority order information 44. The migration control unit 51 identifies the data center 11 having the highest priority, among the data centers 11 that do not satisfy the migration conditions, as the data center 11 serving as the migration destination.

The flow of migrating a system to be evacuated will be specifically described. The migration control unit 51 determines, from the operations system information 40, the server device 13 serving as the migration source on which a system to be evacuated is running, and a virtual machine to be migrated. The migration control unit 51 transmits an instruction for migration of a virtual machine to be migrated to the server device 13 of the data center 11 serving as the migration destination, to the hypervisor of the server device 13 serving as the migration source so as to migrate the virtual machine. Note that, when issuing an instruction for migration to the server device 13 of another data center 11, the migration control unit 51 may transmit the instruction for migration via the management device 14 of the other data center 11. Upon completion of migration, the migration control unit 51 updates, with the results of migration, the operations system information 40 for the server device 13 from which the system that was to be evacuated was migrated.

Figure 8:
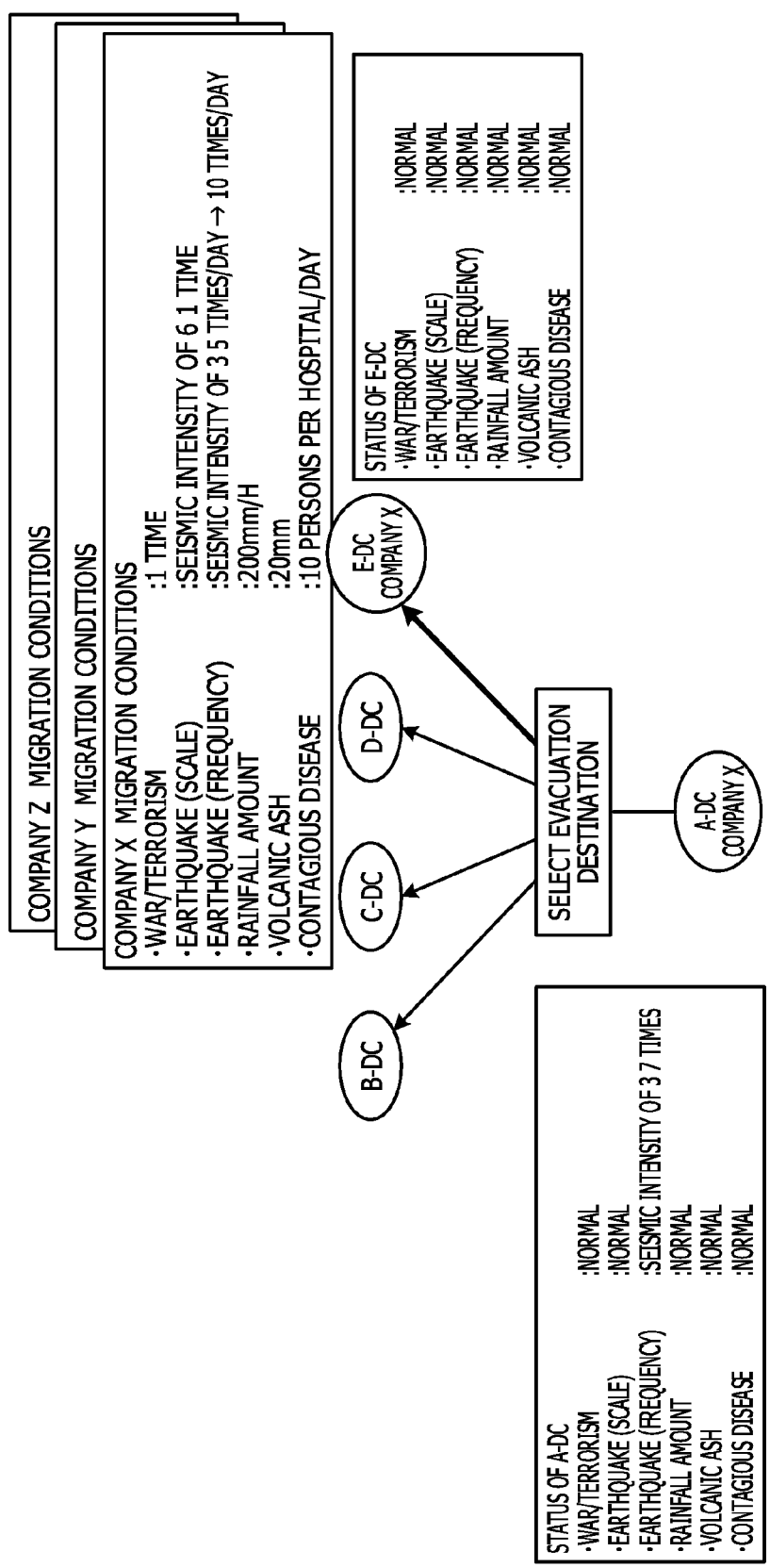
FIG. 8 is a diagram illustrating an example of a flow of migrating a system to be evacuated.

FIG. 8 is a diagram illustrating an example of a flow of migrating a system to be evacuated. In the example of FIG. 8, the system of company X operates in a data center of company A (A-DC). For the system of company X, migration conditions are a case where a war has started, a case where one earthquake with a seismic intensity of 6 or more has occurred in one day, and a case where five earthquakes with a seismic intensity of 3 or more have occurred in one day. For the system of company X, migration conditions are also a case where the rainfall amount is greater than or equal to 200 mm/H, a case where volcanic ash has accumulated to a depth greater than or equal to 20 mm, and a case where the number of patients of a contagious disease per hospital is 10 or more a day.

In the example of FIG. 8, it is assumed that, in the data center of country A, an earthquake with a seismic intensity of 3 or more has occurred seven times in one day. The migration control unit 51 identifies the system of company X as a system to be evacuated as the status of occurrence of the disaster satisfies the migration condition for company X. The migration control unit 51 identifies the data center 11 that does not satisfy the migration conditions for company X as the data center 11 serving as the migration destination. In the example of FIG. 8, among the data center in country B (B-DC), the data center in country C (C-DC), the data center in country D (D-DC), and the data center in country E (E-DC), the data center in country E, in which no disaster has occurred, does not satisfy the migration conditions of company X. The migration control unit 51 sets the data center in country E as the data center 11 serving as the migration destination and migrates the system of company X to the data center in country E.

In general, for the initial values of migration conditions, the conditions are set so as to provide a sufficient margin, so that system operations are not affected by the occurrence of a disaster. For this reason, when the management device 14 migrates a system that satisfies a migration condition, unnecessary migration sometimes occurs even though a disaster has no effect on the data center 11 and thus has no effect on the system operations. Migration of a system is expensive in some cases. For this reason, occurrence of unnecessary migration increases running costs.

The detection unit 52 performs various kinds of detection. For example, the detection unit 52 detects the operational status of the data center 11. For example, the detection unit 52 detects, as the operational status of the data center 11, the status of occurrence of an error in an operational status inspection system that runs in the data center 11. For example, the detection unit 52 detects whether or not an abnormality has occurred, by using the log of a basic input output system (BIOS) of the server device 13 on which the operational status inspection system is running, a thermal error, the event log of the OS of a virtual machine, a monitor ALARM message, or the like.

The change unit 53 makes various changes. For example, when, as a result of detection performed by the detection unit 52, the operational status of the data center 11 is not affected by a disaster, the change unit 53 makes a change to mitigate the migration conditions of a system to be evacuated in the migration condition information 41 stored in the storage unit 30. For example, the change unit 53 refers to the settings of the change setting information 43 corresponding to a disaster that satisfies a migration condition of a system, and confirms whether or not a change of the migration condition is permitted. For example, in the case of FIG. 6, for the system of company A, a change of the migration condition of war is not permitted. In contrast, for the system of company A, changes of the migration conditions of earthquake (scale), earthquake (frequency), rainfall amount, volcanic ash, and contagious disease are permitted. When a change of a migration condition is permitted, the change unit 53 makes a change to mitigate the migration condition. For example, when, despite the fact that a threshold set as a migration condition in the migration condition information 41 is s1, if a detected value is a1, the change unit 53 changes the threshold to (s1+a1)/2. As another example, when, despite the fact that the migration condition is that the number of earthquakes with a seismic intensity of 3 or more is 10 per day, if 16 earthquakes with a seismic intensity of 3 or more have occurred in a single day, the number of earthquakes with a seismic intensity of 3 or more as the migration condition is changed to 13 (=(10+16)/2). In addition, for example, when, despite the fact that the seismic intensity of one earthquake that has occurred is six in the migration condition, if a detected seismic intensity is seven, the seismic intensity of the migration condition is changed to 6.5 (=(6+7)/2). Note that the change method for mitigating a migration condition is not limited to this. Any of the methods that change migration conditions within a range where a disaster has no effect on the operating status may be adopted. For example, a new threshold may be obtained by weighting the threshold of a migration condition and an actual value that is not affected by a disaster. In the example of FIG. 8, the disaster has no effect on the data center of country A, and therefore, regarding the migration condition for the earthquake (frequency), the number of earthquakes with a seismic intensity of 3 or more is changed from five a day to seven a day.

In such a way, the change unit 53 changes a migration condition, thus making it possible to suitably mitigate the migration condition to the extent that the system operation is not affected by the change. Therefore, the occurrence of unnecessary migration may be reduced.

When, as a result of detection performed by the detection unit 52, a disaster has no effect on the operational status of the data center 11 serving as the migration destination, the migration control unit 51 returns a system that is to be evacuated and that was previously migrated, to the original data center 11.

[Flow of Process]

Figure 9:
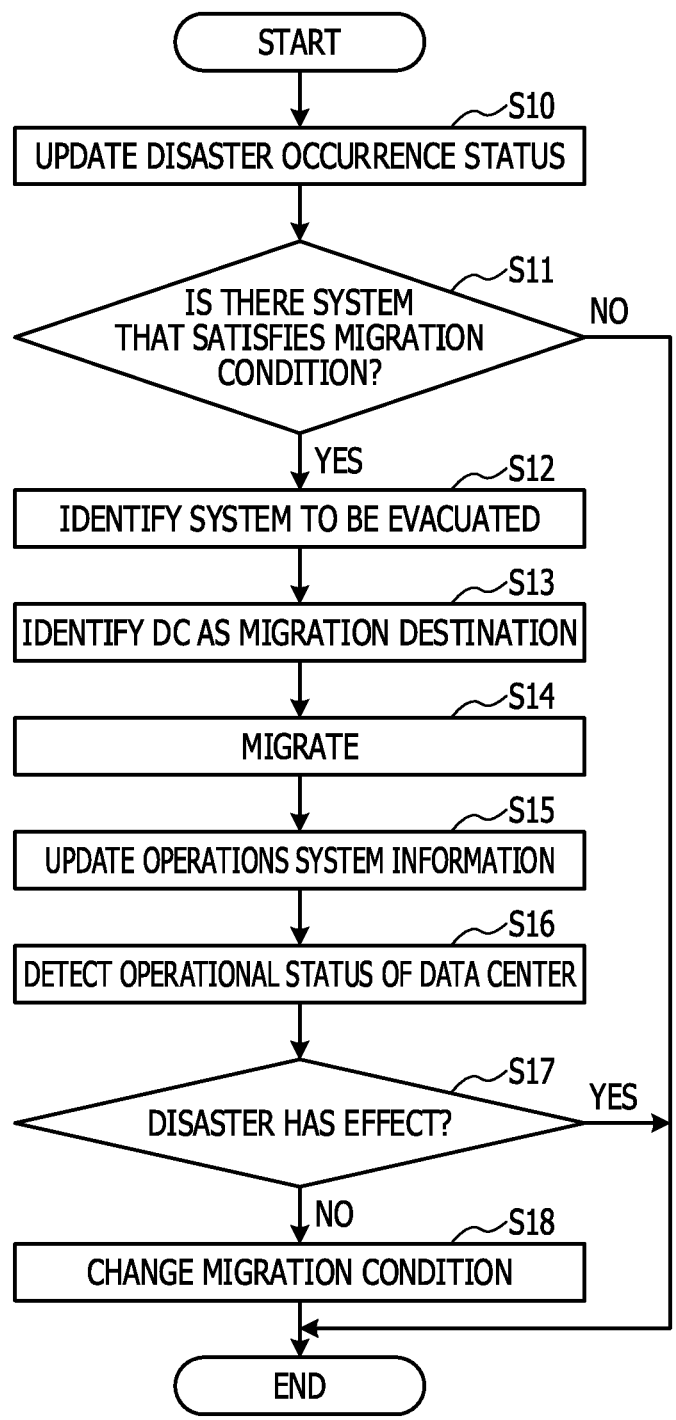
FIG. 9 is a flowchart illustrating an example of a procedure of a migration control process.

Next, the flow of a migration control process in which the management device 14 of the first embodiment controls migration of a system in accordance with the status of occurrence of a disaster will be described. FIG. 9 is a flowchart illustrating an example of a procedure of a migration control process. The migration control process is performed at a given timing, for example, each time the acquisition unit 50 acquires disaster information. Note that the migration control process may be performed periodically at intervals of a certain period of time, for example, every 10 minutes. An example where the system of each company operates in the data center 11 of country A and the management device 14 of the data center 11 in country A performs the migration control process will now be described.

As illustrated in FIG. 9, the acquisition unit 50 updates the disaster occurrence status information 42 based on the acquired disaster information (S10). The migration control unit 51 determines whether or not the status of occurrence of a disaster indicated by the disaster occurrence status information 42 satisfies a migration condition of any system of the migration condition information 41 (S11). When the migration condition of a system is not satisfied ("No" in S11), migration of the system is not performed and thus the process is completed.

When the migration condition of a system is satisfied ("Yes" in S11), the migration control unit 51 identifies a system that satisfies the migration condition as a system to be evacuated (S12). Using disaster information of the other data centers 11, the migration control unit 51 identifies, as the data center 11 serving as the migration destination, the data center 11 whose status of occurrence of a disaster does not satisfy any migration condition of the system to be evacuated (S13). The migration control unit 51 migrates the system to be evacuated to the data center 11 serving as the migration destination (S14). Upon completion of migration, the migration control unit 51 updates, with the results of migration, the operations system information 40 for the server device 13 from which the system that was to be evacuated was migrated (S15).

The detection unit 52 detects the operational status of the data center 11 (S16). For example, the detection unit 52 detects whether or not an abnormality has occurred in the server device 13 on which the operational status inspection system is running. The change unit 53 determines whether or not a disaster has an effect on the data center 11 based on detection of the operational status (S17). For example, the change unit 53 determines whether or not an abnormality such as an error has been detected in the server device 13 on which the operational status inspection system is running. When a disaster has an effect ("Yes" in S17), the process is completed.

On the other hand, when a disaster does not have an effect ("No" in S17), the change unit 53 makes a change to mitigate the migration condition of the system to be evacuated (S18) and ends the process.

Figure 10:
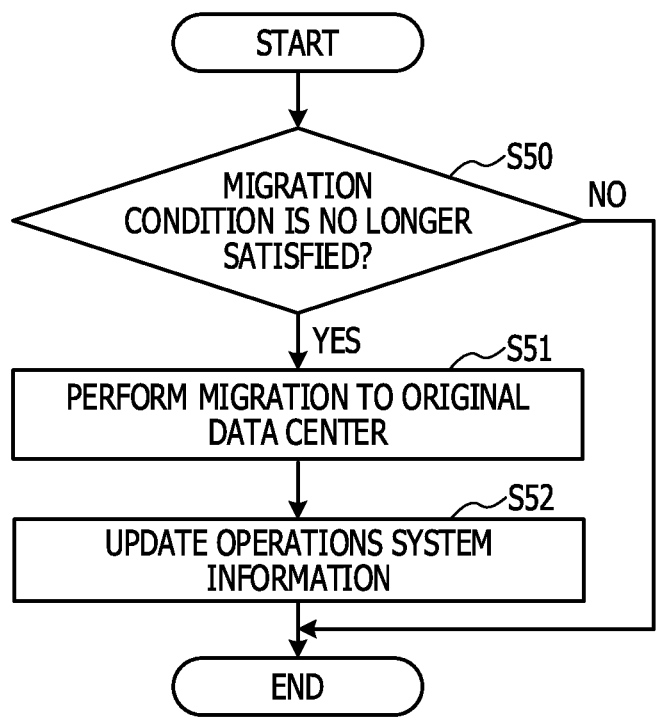
FIG. 10 is a flowchart illustrating an example of a procedure of a return process.

Next, the flow of a return process in which the management device 14 according to the first embodiment migrates the system to be evacuated to the data center 11 serving as the migration source will be described. FIG. 10 is a flowchart illustrating an example of a procedure of a return process. The return process is performed at set intervals, for example, every 10 minutes, after the system to be evacuated is migrated.

As illustrated in FIG. 10, the migration control unit 51 determines whether or not the status of occurrence of a disaster indicated by the disaster occurrence status information 42 no longer satisfies the migration condition of the system to be evacuated (S50). If the status of occurrence of a disaster satisfies the migration condition of the system to be evacuated ("No" in S50), the process is completed.

On the other hand, if the status of occurrence of a disaster does not satisfy the migration condition of the system to be evacuated ("Yes" in S50), the migration control unit 51 migrates the system to be evacuated to the data center 11 serving as the migration source (S51). Upon completion of migration, the migration control unit 51 updates, with the results of migration, the operations system information 40 for the server device 13 from which the system that was to be evacuated was migrated (S52).

[Advantages]

As described above, the management device 14 according to this embodiment stores, in the storage unit 30, migration conditions for each disaster type for migrating systems operating on the data centers 11 that are arranged at a plurality of locations being geographically separate from one another and that are able to communicate with each other. The management device 14 acquires disaster information indicating the status of occurrence of a disaster that has an effect on the data center 11. The management device 14 migrates a system for which the status of occurrence of a disaster indicted by the acquired disaster information satisfies a migration condition stored in the storage unit 30. The management device 14 detects the operational status of the data center 11. When, as a result of detection, the disaster has no effect on the operational status of the data center 11, the management device 14 makes a change to mitigate the migration condition stored in the storage unit 30. Thus, the management device 14 may reduce the occurrence of unnecessary migration.

The management device 14 according to this embodiment migrates a system whose status of occurrence of a disaster satisfies a migration condition to another data center 11 whose status of occurrence of a disaster does not satisfy migration conditions. Thus, the management device 14 may move a system to another data center 11 even when a disaster has occurred, and therefore enables systems to operate stably.

Furthermore, the management device 14 according to this embodiment makes a change to mitigate a migration condition of a type for which a condition change is permitted in the situation where whether or not to permit a condition change is set for each type of migration condition. Thus, the management device 14 may suitably change a migration condition by setting whether or not to permit mitigation for each type of migration condition. Furthermore, a migration condition that is not to be changed is set so that a change of the migration condition is not permitted, and thereby the migration condition may be inhibited from being changed.

Furthermore, the management device 14 according to this embodiment detects the status of occurrence of an error in the operational status inspection system running in the data center 11, as the operational status of the data center 11. The management device 14 makes a change to mitigate a migration condition when an error has not occurred in the operational status inspection system. Thus, the management device 14 may automatically detect whether or not an abnormality having an effect on the operations of systems in the data center 11 has occurred, and may mitigate a migration condition when the abnormality has not occurred.

Second Embodiment

Although the embodiment related to the device in the present disclosure has been described, the techniques of the present disclosure may be carried out in various different forms other than the embodiment described above. Accordingly, another embodiment included in the present disclosure will be described below.

For example, although, in the above embodiment, the case where the operational status of the data center 11 is detected from the status of occurrence of an error in the operational status inspection system has been described, the device in the present disclosure is not limited to this. For example, the operational status of the data center 11 may be detected by using detection values of various sensors provided in the data center 11. The operational status of the data center 11 may also be detected via a request performed by the administrator.

In addition, configuration elements of each device in the drawings are functionally and conceptually illustrated and do not have to be configured physically as illustrated. That is, specific states of distribution and integration of devices are not limited to those illustrated in the drawings, and all or part of those may be configured so as to be distributed and integrated functionally or physically in any units in accordance with various loads, usage statuses, and the like. For example, processing units such as the acquisition unit 50, the migration control unit 51, the detection unit 52, and the change unit 53 may be integrated as appropriate. The processing of processing units may be appropriately separated into a plurality of processing units. Furthermore, for processing functions performed by processing units, all or part of those may be implemented by a CPU or a program analyzed and executed by the CPU or may be implemented as hardware through wired logic.

[Migration Control Program]

Figure 11:
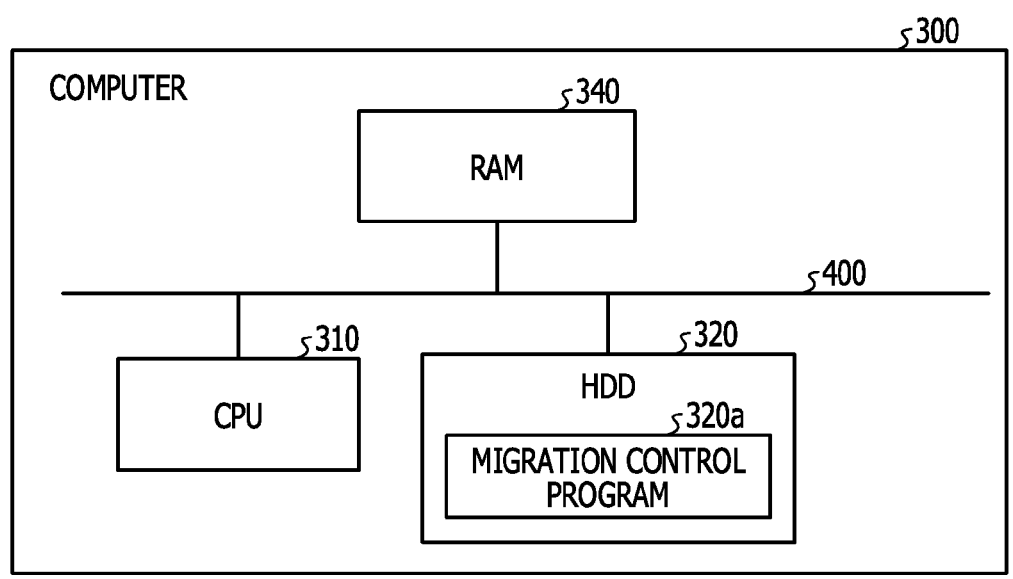
FIG. 11 is a diagram illustrating a computer that executes a migration control program.

Furthermore, various kinds of processing described in the above embodiment may be implemented by executing a program prepared in advance on a computer system of personal computers, work stations, and the like. Accordingly, an example of a computer system on which a program having functions similar to those of the above embodiment will be described below. FIG. 11 is a diagram illustrating a computer that executes a migration control program.

As illustrated in FIG. 11, a computer 300 includes a CPU 310, a hard disk drive (HDD) 320, a random access memory (RAM) 340. These units 300 to 340 are coupled via a bus 400.

In the HDD 320, a migration control program 320a that exerts functions similar to those of the acquisition unit 50, the migration control unit 51, the detection unit 52, and the change unit 53 are stored in advance. Note that the migration control program 320a may be separated as appropriate.

The HDD 320 also stores various kinds of information. For example, the HDD 320 stored various kinds of data used for an OS and production plans.

The CPU 310 reads and executes the migration control program 320a from the HDD 320 to perform operations similar to the processing units of the embodiment. That is, the migration control program 320a performs operations similar to those of the acquisition unit 50, the migration control unit 51, the detection unit 52, and the change unit 53.

Note that the migration control program 320a mentioned above dos not have to be stored in advance in the HDD 320.

For example, the program is stored in a "portable physical medium" such as a flexible disk (FD), a CD-ROM, a DVD disk, a magneto-optical disk, or an IC card to be inserted into the computer 300. Then, the computer 300 may read and execute the program from the medium.

Furthermore, a program is stored in "another computer (or a server)" coupled to the computer 300 via a public network, the Internet, a local area network (LAN), a wide area network (WAN), or the like. Then, the computer 300 may read and execute the program from the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
  a memory configured to hold a threshold value for determining whether or not to migrate a first virtual machine that runs on a first information processing apparatus included in a plurality of information processing apparatuses, to another information processing apparatus included in the plurality of information processing apparatuses; and
  a processor coupled to the memory and configured to
    monitor a status at a location of the first information processing apparatus,
    when the status exceeds the threshold value, execute a migration of the first virtual machine that runs on the first information processing apparatus to the another information processing apparatus,
    after executing the migration of the first virtual machine, execute detecting whether an error occurs in the first information processing apparatus, and
    change the threshold value so as to suppress the migration of the first virtual machine from the first information processing apparatus to the another information processing apparatus, when it is detected that the error does not occur in the first information processing apparatus after the migration of the first virtual machine.

2. The apparatus according to claim 1, wherein the processor is configured to
  when the status exceeds the threshold value in the first information processing apparatus and the status does not exceed the threshold value in the another information processing apparatus, migrate the first virtual machine from the first information processing apparatus to the another information processing apparatus.

3. The apparatus according to claim 1, wherein
  the threshold value includes a plurality of items, each of the plurality of items being given a setting for whether or not it is possible to make a change, and
  the processor is configured to, when changing the threshold value, change, among the plurality of items, an item containing a setting indicating that it is possible to make a change.

4. The apparatus according to claim 1, wherein the processor is configured to
  detect a status of occurrence of the error in an operational status inspection system that runs on the first information processing apparatus.

5. The apparatus according to claim 1, wherein the processor is configured to
  after migrating the first virtual machine from the first information processing apparatus to the another information processing apparatus, migrate the first virtual machine from the another information processing apparatus to the first information processing apparatus when an amount of the error obtained as the result of the detecting is less than or equal to a given amount.

6. The apparatus according to claim 1, wherein the processor is configured to
  when, by the detecting, the amount of the error is less than or equal to a given amount, make the change so as to mitigate the threshold value.

7. The apparatus according to claim 1, wherein the processor is configured to
  acquire, as the status, disaster information indicating a status of an external environment of the first information processing apparatus of the location at which the first information processing apparatus is located, and migrate the first virtual machine from the first information processing apparatus to the another information processing apparatus when the status of the disaster indicated by the disaster information exceeds the threshold value.

8. The apparatus according to claim 7, wherein
  the threshold value is determined for each kind of the disaster.

9. The apparatus according to claim 1, wherein
  the another information processing apparatus is located at different geographical location from the first information processing apparatus.

10. A method using a plurality of information processing apparatuses, the method comprising:
  holding, in a memory, a threshold value for determining whether to migrate a first virtual machine that runs on a first information processing apparatus included in the plurality of information processing apparatuses, to another information processing apparatus included in the plurality of information processing apparatuses;
  monitoring a status at a location of the first information processing apparatus;

when the status exceeds the threshold value, executing a migration of the first virtual machine that runs on the first information processing apparatus to the another information processing apparatus;

after executing the migration of the first virtual machine, detecting whether an error occurs in the first information processing apparatus, and changing the threshold value so as to suppress the migration of the first virtual machine from the first information processing apparatus to the another information processing apparatus, when it is detected that the error does not occur in the first information processing apparatus after the migration of the first virtual machine.

11. The method according to claim 10, wherein when the status exceeds the threshold value in the first information processing apparatus and the status does not exceed the threshold value in the another information processing apparatus, the first virtual machine is migrated from the first information processing apparatus to the another information processing apparatus.

12. The method according to claim 10, wherein the threshold value includes a plurality of items, each of the plurality of items being given a setting for whether or not it is possible to make a change, and when changing the threshold value, among the plurality of items, an item containing a setting indicating that it is possible to make a change is changed.

13. The method according to claim 10, further comprising:

detecting a status of occurrence of the error in an operational status inspection system that runs on the first information processing apparatus.

14. The method according to claim 10, further comprising:

after migrating the first virtual machine from the first information processing apparatus to the another information processing apparatus, migrating the first virtual machine from the another information processing apparatus to the first information processing apparatus when an amount of the error obtained as the result of the detecting is less than or equal to a given amount.

15. The method according to claim 10, further comprising:

when, by the detecting, the amount of the error is less than or equal to a given amount, making the change so as to mitigate the threshold value.

16. The method according to claim 10, further comprising:

acquiring, as the status, disaster information indicating a status of an external environment of the first information processing apparatus of a location at which the first information processing apparatus is located, and migrating the first virtual machine from the first information processing apparatus to the another information processing apparatus when the status of the disaster indicated by the disaster information exceeds the threshold value.

17. The method according to claim 16, wherein the threshold value is determined for each kind of the disaster.

18. The method according to claim 10, wherein the another information processing apparatus is located at different geographical location from the first information processing apparatus.

19. A system comprising:

a plurality of information processing apparatuses; and a managing apparatus including a memory and a processor coupled to the memory, wherein the memory is configured to hold a threshold value for determining whether to migrate a first virtual machine that runs on a first information processing apparatus included in the plurality of information processing apparatuses, to another information processing apparatus included in the plurality of information processing apparatuses, and a processor is configured to monitor a status at a location of the first information processing apparatus, when the status exceeds the threshold value, execute a migration of the first virtual machine that runs on the first information processing apparatus to the another information processing apparatus, after executing the migration of the first virtual machine, execute detecting whether an error occurs in the first information processing apparatus, and change the threshold value so as to suppress the migration of the first virtual machine from the first information processing apparatus to the another information processing apparatus, when it is detected that the error does not occur in the first information processing apparatus after the migration of the first virtual machine.

20. The apparatus according to claim 1, wherein the processor is further configured to, when the result of the detecting indicates that no error has occurred in the first information processing apparatus, migrate the first virtual machine from the another information processing apparatus back to the first information processing apparatus and increase the threshold value.

* * * * *